United States Patent
Melaaen et al.

(10) Patent No.: US 6,964,754 B2
(45) Date of Patent: Nov. 15, 2005

(54) POLYMERIZATION REACTOR

(75) Inventors: Ingrid S. Melaaen, Skjelsvik (NO);
Paul Allemeersch, Tessenderlo (BE);
Odd Jarle Vargal, Skien (NO); Ben Arve Olsen, Porsgrunn (NO); Lars Tore Grimsland, Langesund (NO);
Tone Aastad, Stahelle (NO)

(73) Assignee: Borealis Technology Oy, (FI)

( * ) Notice: Subject to any disclaimer, the term of this patent is extended or adjusted under 35 U.S.C. 154(b) by 0 days.

(21) Appl. No.: 10/494,078

(22) PCT Filed: Oct. 30, 2002

(86) PCT No.: PCT/EP02/12111

§ 371 (c)(1),
(2), (4) Date: Sep. 3, 2004

(87) PCT Pub. No.: WO03/037499

PCT Pub. Date: May 8, 2003

(65) Prior Publication Data
US 2005/0038206 A1   Feb. 17, 2005

(30) Foreign Application Priority Data
Oct. 30, 2001  (EP) ................................. 01309185

(51) Int. Cl.[7] .............................................. C08F 2/04
(52) U.S. Cl. ........................................ 422/132; 526/64
(58) Field of Search .................. 526/64, 132; 422/132

(56) References Cited

U.S. PATENT DOCUMENTS

| | | | |
|---|---|---|---|
| 3,195,613 A | 7/1965 | Hawkins | |
| 4,121,029 A | 10/1978 | Irvin et al. | 526/64 |
| 4,395,523 A | 7/1983 | Kirch | 526/64 |
| 4,461,889 A | 7/1984 | Hanson | |
| 4,613,484 A | 9/1986 | Ayres et al. | |
| 5,183,866 A | 2/1993 | Hottovy | 526/88 |
| 5,575,979 A * | 11/1996 | Hanson | 422/132 |

FOREIGN PATENT DOCUMENTS

| | | |
|---|---|---|
| EP | 0891990 | 1/1999 |
| WO | WO 01/05842 | 1/2001 |

* cited by examiner

Primary Examiner—William K. Cheung
(74) Attorney, Agent, or Firm—Needle & Rosenberg, P.C.

(57) ABSTRACT

A setting leg for a polymerization reactor connected to the lower part of the loop reactor (1). A conduit (2) is welded to the loop reactor and leads to upper valve (3) and lower block valve (4). Downstream of the lower block valve (4) is a further conduit (5) which leads to a lower region (6) and to a product take off (PTO) valve 7. Conduit (5) has a significantly greater cross-sectional area than conduit (2). In use, the block valves (3) and (4) are always open to allow slurry from the reactor loop to enter the settling leg. The PTO valve (7) is regularly opened to allow the settled polyethylene "fluff" to be rapidly expelled along conduit (8). The greater area of conduit (5) significantly increases the settling rate ad polymer concentration of the polyethylene "fluff".

8 Claims, 1 Drawing Sheet

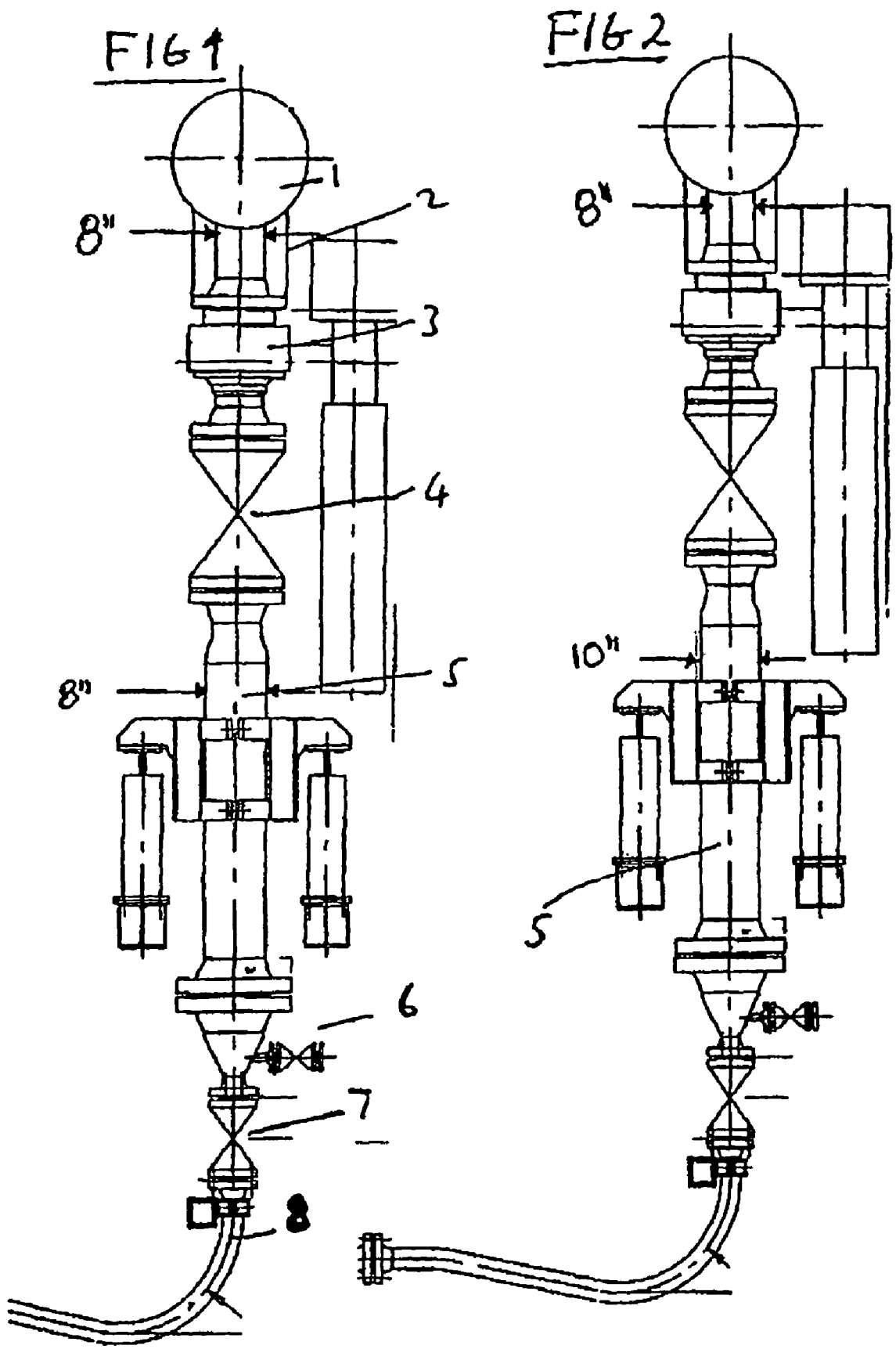

POLYMERIZATION REACTOR

CROSS REFERENCE TO RELATED APPLICATIONS

The present application claims priority to European Application No. 01309185.5, filed Oct. 30, 2001, which application is incorporated herein fully by this reference.

The present invention relates to apparatus for use in the manufacture of polymers, and in particular to the design of the settling leg(s) of a polymerisation reactor.

Polymers such as polyethylene are typically manufactured according to the Phillips process in a pressurized loop reactor using a so-called slurry system where the polymer is continuously formed as the reactants are circulated around the loop reactor in the liquid state. The polymer product forms as a solid that is suspended within the liquid.

When polyethylene is to be produced in this way, high purity ethylene is supplied to the reactor together with certain other materials. A low boiling point hydrocarbon such as isobutane is used to dissolve the ethylene monomer and to suspend catalyst and polymer particles within the reactor. The isobutane plays no part in the actual polymerization reation and so it is eventually recovered, purified and recycled. In addition, hydrogen is added to control the molecular weight of the polyethylene produced and 1-hexene co-monomer is added in order to control product density. The reaction is typically catalysed using chromium, Ziegler Natta or metallocene catalyst.

The ethylene gas, diluent and powdered catalyst are fed continuously into the loop reactor where they are rapidly circulated by means of a pump. The reactor core is typically maintained at a temperature of the order of 100° C. and a pressure of the order of 4 MPa. During normal operation, the reactor contains about 40 wt % polyethylene. As the process continues, polymer particles start to form and the larger ones precipitate as "fluff" and enter a settling zone from which concentrated slurry is periodically discharged.

The production system is continuous such that the product is removed at the same rate at which it is formed. The polymer product is mixed with isobutane diluent and it is clearly desirable to reduce the amount of isobutane that leaves the reactor with the polymer. This isobutane must be purified and re-compressed before being fed back into the reactor which adds significant cost to the process.

In order to increase the concentration of the polymer before it is discharged, settling legs (or dump legs) are used. A settling leg is a conduit connected to a section of the loop reactor via an outlet conduit that is welded to the loop reactor. The geometry of the settling leg is chosen so that the liquid within it is comparatively still in order to increase fluff settlement. Flow out of the settling leg is controlled by a valve arrangement so that the concentrated slurry is periodically discharged from the reactor.

Although other arrangements have been proposed and used, the most common system is for the settling leg to take the form of a vertical tube extending downwardly from the lowermost point on the loop reactor core. It is typically connected to the reactor by one or two block valves with a further, so-called product take-off, valve (PTO) being provided at the lower end of the settling leg. The settling leg is arranged in relation to the loop reactor such that the flow of slurry across the opening thereof provides a resting zone where the polymer particles settle out to some extent from the diluent. This increases polymer concentration to perhaps 60 wt %.

The block valves are only closed in the event of irregular operation of the reactor, such as plugging, to enable safe demounting of the settling leg for maintenance or cleaning purposes. (When they are open they do not constrict the leg.) Thus, during operation, the block valves are constantly open to enable slurry from the reactor to enter the settling leg. Due to the higher density of the polymer fluff compared to the diluent, the concentration of fluff in the settling leg will increase. The amount of product settled (i.e. the product concentration in the leg) is known to depend on particle properties, diluent density, cross sectional area of the leg and the resting time.

The content of the settling leg is periodically discharged via the PTO valve in a process known as firing. In a typical reactor there are a number of settling legs and each is fired at a different time about once per minute. To fire a leg, the PTO valve is opened for a few seconds. The pressure within the reactor rapidly forces the contents of the leg out through the PTO valve to a flash chamber wherein the mixture is flashed for substantially complete removal of diluent and any traces of monomer.

Such an arrangement is well known and is illustrated, for example, in U.S. Pat. No. 5,183,866 which primarily concerns improvements to the evaporation of diluent. A further example is U.S. Pat. No. 4,461,889 which proposes the use of a filter vessel downstream of the settling leg in order to improve the removal of polymer solids from diluent before the polymer is fed to a flash tank.

It will be appreciated that the velocity at which the polymer is settling in the settling leg so that it may then be discharged, has a significant effect on the overall rate of production of the reactor. It also determines the rate of diluent flow to the reactor. The mass of polymer settling per unit time is termed the settling rate and in a modern loop reactor the settling rate provides one of the main limitations to increased production capacity. This limitation can be addressed by increasing diluent capacity, but this requires extremely expensive modifications to a typical reactor.

It has already been mentioned that the settling rate depends on polymer fluff properties. These are in turn determined by the catalyst properties and cannot normally be changed without affecting the properties of the final polymer product. Indeed, the change from one catalyst to another (e.g. to produce a polymer with different properties) may change the fluff properties to such an extent that production capacity is reduced by 25%. For example, such a reduction may be seen if production using metallocene catalyst to produce polymer for rotomoulding is compared with blow moulding polymer produced using chromium catalyst. Thus, the general desire to increase settling rate may be especially acute in such circumstances.

Furthermore, if polymer solid content is too low, problems are caused in the operation of the flash drum. This is because flash drums are designed to use heat from the material fed to them. Solid polymer has a higher heat capacity than diluent, so lower polymer content may result in too little heat reaching the flash drum to evaporate completely the diluent.

In order to provide improved polymer settling and thereby to reduce diluent content in the slurry, U.S. Pat. No. 4,613,484 describes the use of various arrangements of settling legs. These include the use of inclined portions in combination with a diluent recycle line out of the settling leg and a small stream of feed diluent into the settling leg. However, constructing inclined settling legs provides practical difficulties and the additional conduits and valving involved in providing the diluent recycle and feed diluent lines add a significant degree of complexity and cost.

EP-A-0891990 identifies the problem of the bottleneck provided by the use of settling legs and furthermore explains that increasing the diameter of settling legs causes significant difficulties because it is not practicable to increase the diameter of the block valves between the loop and the leg. As a consequence of this, it explains, the normal practice in the art has been to increase the number of settling legs on each loop. However, this also causes practical difficulties as the number of legs required starts to exceed the space available. In response to these difficulties the document proposes eliminating the settling step altogether by increasing the polymer concentration of the slurry in the reactor and utilising continuous product take-off.

WO 01/05842 also disclosed a loop reactor that is designed for continuous product take-off.

It will be appreciated that this approach is not appropriate in many circumstances and it will often not be possible or desirable to modify reactor conditions to enable continuous take-off to be used. For example, one cannot increase the polymer concentration of the slurry beyond certain limits imposed by the flow characteristics of the slurry.

According to the present invention there is provided a settling leg for a polymerisation reactor comprising a first tubular portion for connection in fluid communication with a polymerisation reactor and a second tubular portion connected to the first tubular portion via at least one block valve, wherein the second tubular portion has a greater internal cross-sectional area than the first tubular portion.

Thus, by means of the invention, the settling leg comprises a portion of increased cross-sectional area that in use is downstream of the valve. (Normally the tubular portions are of circular cross-section and so this will correspond to an increase in diameter.) Thus, by means of the invention, the size of the block valve(s) does not limit the maximum diameter of the settling leg. As explained in EP-A-0891990 (referred to above) the diameter of the block valves had been regarded as limiting the diameter of settling legs. In line with normal practice it is preferred that there are two block values and these typically have an internal diameter when fully open which is substantially the same as that of the first tubular portion.

It has been found that this arrangement has a significant effect in improving the rate of settlement of the polymer compared to a settling leg having a constant diameter corresponding to that of the first portion. Thus, the invention is based upon the surprising finding that, contrary to the received wisdom in the art, the settling rate can be improved without increasing the diameter of the portion of the settling leg that is joined to the reactor and without increasing the block valve size. This is because it has been found that settling rate is determined by the diameter of the lower portion of the leg—the diameter of the upper part has been found not to be determinative. Settling rate can therefore be improved more easily and less expensively than previously.

Moreover, compared to a settling leg of the same volume in which the first and second portions are of equal diameter, the invention also provides an increased volume to length ratio that assists in preventing slurry with a high diluent concentration being discharged during firing of the leg.

Preferably the first tubular portion comprises less than half the length of the leg and serves merely to connect the valve to a loop reactor.

The invention is not limited to particular sizes of first and second portions—these may be selected depending on the requirements of a given situation. For the invention to have any significant benefit, however, the second portion should be at least 10% greater in diameter than the first. To improve performance further the second portion is preferably more than 25% or even up to 50% or more larger. It is believed that a practical upper limit is reached when the value is 100%— i.e. when the second portion is twice the diameter of the first.

For the best overall performance, the ratio of the diameter of the first to the second portion is preferably in the range of from 1:1.2 to 1:1.6 and most preferably from 1:1.25 to 1:1.5.

Although the actual tube diameter can be varied, the first portion is preferably between 8 and 12 inches. The second portion is preferably between 10 and 14 inches in diameter, although it could be as much as 30 inches. (The pipe sizes used here are the typical nominal sizes as specified in this art, dimensioned in inches as is conventional.) For example, the diameters may be a nominal 8 and 10 inches in diameter, or a nominal 10 and 12 inches in diameter.

In a particularly preferred form of the invention the settling leg comprises a first tubular portion (e.g. nominal 8") for connection to the loop part of a reactor, downstream of which is a pair of block valves and further downstream the diameter is increased to form the second tubular portion (e.g. nominal 10") which in turn leads to a PTO valve.

The invention also extends to a polymerisation reactor comprising a settling leg as previously described. Such a reactor can be operated with a higher production rate than would be possible without a settling leg according to the invention because the higher settling rate allows product to be removed from the reactor more quickly.

The invention also extends to a method in which the setting leg described may be used to produce polymer. Thus, viewed from another aspect the invention provides a method of producing a polymer comprising the use of a reactor as previously described. More specifically it provides a method of producing polymer comprising the steps of supplying reactant(s), diluent and catalyst to a loop reactor and periodically discharging polymer product therefrom via a settling leg, wherein the settling leg comprises a first portion connected to the loop reactor, a second portion downstream of the first portion and isolatable therefrom by a block valve, the second portion having a greater diameter than the first portion, the flow of polymer from the settling leg being controlled by a valve downstream of the second portion which is periodically opened.

Furthermore, the invention extends to a polymer produced using such a reactor or such a method.

An embodiment of the invention will now be described, by way of example only, and with reference to the the accompanying drawings:

BRIEF DESCRIPTIONS OF THE DRAWINGS

FIG. 1 is a schematic view of a prior art settling leg; and

FIG. 2 is a corresponding view of a setting leg according to the invention.

As may be seen from FIG. 1, the known settling leg is connected to the lower part of loop reactor 1. An 8" nominal diameter (actually 219 mm outside and 189 mm inside diameters) conduit 2 is welded to the loop reactor and leads to upper block valve 3 and lower block valve 4.

Downstream of the lower block valve 4 is a further conduit 5 that is also of 8" nominal diameter. This in turn leads to lower region 6 and to a PTO valve 7. The PTO valve 7 controls flow into conduit 8 that leads to a flash tank (not shown).

The block valves are only closed for maintenance or in emergencies. The lower block valve 4 duplicates the upper block valve 3 and is provided as a safety feature. Thus, in use, the block valves are always open to allow slurry from the reactor loop to enter the settling leg.

The slurry is a primarily liquid mixture of monomer (ethylene), diluent (iso-butane), co-monomer (1-hexene), hydrogen and catalyst. Inside the reactor the pressure is around 4 Mpa. It is circulated around the loop reactor at around 10–12 m/s. Typical residence time is 45 minutes.

As it is produced, polyethylene forms a solid "fluff" which is suspended in the slurry. Within the settling leg the slurry is comparatively still and so the fluff settles out and sinks to the bottom of the leg, thereby increasing its concentration from 40 wt % to 60 wt %.

The illustrated settling leg is one of several connected to the bottom of the loop reactor 1. Each of these is periodically "fired" whereby the PTO valve 7 is opened for a few seconds every minute. The pressure downstream of the valve 7 is only 0.15 Mpa (compared to 4 MPa upstream) and so its contents are rapidly expelled along conduit 8.

Conduit 8 leads to a flash drum in which the polymer fluff or powder is separated out. The remaining isobutane is then purified, pressurized and then returned to the reactor.

FIG. 2 illustrates a settling leg that is identical to that of FIG. 1 except that the diameter of conduit 5 is increased to 10" nominal (actually 273 mm outside and 222 mm inside diameters). The 8" diameter part is 1.9 m in length and the 10" diameter part is 1.7 m in length, giving a total length of 3.6 m The settling leg of FIG. 2 operates in the same manner as that of FIG. 1, except that due to the increased diameter conduit 5 the settling rate and polymer concentration is significantly increased.

What is claimed is:

1. A settling leg for a polymerisation reactor comprising a first tubular portion for connection in fluid communication with a polymerisation reactor and a second tubular portion connected to the first tubular portion via at least one block valve, wherein the second tubular portion has a greater internal cross-sectional area than the first tubular portion.

2. A settling leg as claimed in claim 1, wherein the first tubular portion comprises less than half of the length of the settling leg.

3. A settling leg as claimed in claim 1, wherein the tubular portions are circular in section and the ratio of the diameter of the first portion to the second portion is in the range from 1:1.1 to 1:2.

4. A settling leg as claimed in claim 1, wherein the cross sectional area of the second portion is at least 50% greater than that of the first portion.

5. A settling leg as claimed in claim 1, wherein the first portion has a nominal diameter of 8 to 12" and the second portion has a nominal diameter of 10 to 14".

6. A polymerisation reactor comprising a settling leg as claimed in claim 1.

7. A method of producing polymer comprising the steps of supplying reactant(s), diluent and catalyst to a loop reactor and periodically discharging polymer product therefrom via a settling leg, wherein the settling leg comprises a first portion connected to the loop reactor, a second portion downstream of the first portion and isolatable therefrom by a block valve, the second portion having a greater diameter than the first portion, the flow of polymer from the settling leg being controlled by a valve downstream of the second portion which is periodically opened.

8. A method as claimed in claim 7 wherein the settling leg comprises a first tubular portion for connection in fluid communication with a polymerisation reactor and a second tubular portion connected to the first tubular portion via at least one block valve, wherein the second tubular portion has a greater internal cross-sectional area than the first tubular portion.

* * * * *